United States Patent
Rautalin (10) Patent No.: US 12,061,273 B2
(45) Date of Patent: Aug. 13, 2024

(54) METHODS AND SYSTEMS FOR CORRECTING A PREDICTED POSITION AND/OR A CLOCK OFFSET OF A NAVIGATION SATELLITE

(71) Applicant: HERE Global B.V., Eindhoven (NL)

(72) Inventor: Sakari Rautalin, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 596 days.

(21) Appl. No.: 17/328,278

(22) Filed: May 24, 2021

(65) Prior Publication Data

US 2022/0373695 A1 Nov. 24, 2022

(51) Int. Cl.
*G01S 19/25* (2010.01)
*G01S 19/07* (2010.01)
*G01S 19/11* (2010.01)

(52) U.S. Cl.
CPC .......... *G01S 19/256* (2013.01); *G01S 19/07* (2013.01); *G01S 19/115* (2019.08)

(58) Field of Classification Search
CPC ........ G01S 19/05; G01S 19/07; G01S 19/115; G01S 19/256; G01S 19/258; G01S 19/40
See application file for complete search history.

(56) References Cited

U.S. PATENT DOCUMENTS

| | | | |
|---|---|---|---|
| 7,839,331 B2 | 11/2010 | Zhang et al. | |
| 8,032,301 B2 | 10/2011 | van Diggelen et al. | |
| 9,612,341 B2 | 4/2017 | Large et al. | |
| 9,739,888 B2 | 8/2017 | Cheng et al. | |
| 10,564,292 B2 | 2/2020 | Rautalin et al. | |
| 2008/0186229 A1* | 8/2008 | Van Diggelen | G01S 19/258 342/357.44 |

FOREIGN PATENT DOCUMENTS

EP 2063283 A2 5/2009

OTHER PUBLICATIONS

Rautalin et al., "Latent Force Models in Autonomous GNSS Satellite Orbit Prediction", 2017 International Conference on Localization and GNSS (ICL-GNSS), (Jun. 27-29, 2017), 6 pages.

* cited by examiner

*Primary Examiner* — Nader Bolourchi (57) ABSTRACT

A method, apparatus and computer program product are provided to correct a predicted value of the position of a navigation satellite and/or a clock offset of a clock of the navigation satellite. In the context of a method implemented by a client computing device, a prediction is received, from a serving computing device, that includes at least one predicted value for the position of the navigation satellite at one or more points in time within a prediction interval. The method also determines, with the client computing device, such as an Internet of Things device, at least one error component and, based thereupon, corrects the prediction received from the serving computing device by correction at least one predicted value for one or more of: (i) the position of the navigation satellite or (ii) the clock offset for the clock of the navigation satellite.

20 Claims, 3 Drawing Sheets

METHODS AND SYSTEMS FOR CORRECTING A PREDICTED POSITION AND/OR A CLOCK OFFSET OF A NAVIGATION SATELLITE

TECHNOLOGICAL FIELD

An example embodiment relates generally to predictions of the position of a navigation satellite and/or a clock offset of a clock of the navigation satellite and, more particularly, to a serving computing device, method and computer program product for providing predictions of the position of a navigation satellite and/or the clock offset of the clock of the navigation satellite to a client computing device and/or to a client computing device, method and computer program product correcting the predicted value(s) of the position of the navigation satellite and/or the clock offset of the clock of the navigation satellite.

BACKGROUND

Positioning and navigation solutions commonly depend upon a Global Navigation Satellite System (GNSS) with signals transmitted by a GNSS satellite being received by GNSS receivers embedded in or otherwise carried by a variety of different devices. For example, smartphones, smart watches, vehicles, drones and other location-aware devices include GNSS receivers in order to allow the position of the device to be determined. In some instances, the device may include a navigation system and/or a navigation application that is dependent upon the signals received by the GNSS receiver in order to determine the position of the device and to provide navigational assistance. The number of devices that include GNSS receivers is growing rapidly with more types of devices including devices, such as Internet of Things (IOT) devices, with limited amounts of computational resources including GNSS receivers.

The GNSS family includes several satellite constellations including the Global Positioning System (GPS) and the Global Orbiting Navigation Satellite System (GLONASS) system. Other GNSS satellite constellations include the Beidou system and the Galileo system. In addition to these global satellite constellations, several regional Satellite-Based Augmentation Systems (SBAS), such as the Quazi-Zenith Satellite System (QZSS), Multifunctional Transport Satellites (MTSAT) Satellite Augmentation System (MSAS), Wide Area Augmentation System (WAAS), European Geostationary Navigation Overlay Service (EGNOS), GPS-Aided Geostationary (GEO) Augmented Navigation (GAGAN) and System for Differential Correction and Monitoring (SDCM), have been developed.

In a GNSS system, a navigation satellite orbiting the earth transmits signals that a GNSS receiver receives and utilizes to determine the position of the GNSS receiver and, in turn, the device in which the GNSS receiver is embedded. The signals transmitted by a navigation satellite include one or more messages with at least a portion of one of the messages including a set of parameter values of an orbit model defining the orbit of the satellite for a limited period of time. The parameter values are known as broadcast ephemeris data. These parameter values may be utilized by the GNSS receiver to determine the position of the navigation satellite relative to a predefined coordinate system, such as in an Earth-Centered-Earth-Fixed (ECEF) coordinate system. In particular, based on the positions of a plurality of navigation satellites, the clock offset of a clock of the navigation satellite relative to GNSS, e.g., GPS, time and the propagation time of the signals broadcast by the satellites and received by the GNSS receiver, the GNSS receiver is configured to determine its position. In this regard, the propagation time may be estimated from a time of transmission of the satellite signal as indicated by the message to a measured time of arrival of the satellite signal at the GNSS receiver.

The parameter values of the orbit model have a certain, limited lifetime, such as four hours, during which the parameter values are valid and the position of the satellite can be estimated based thereupon with a desired accuracy. Following the transmission of the parameter values, the accuracy with which the position of the navigation satellite is defined by the parameter values decreases as the age of the parameter values for the satellite increases. Eventually, the GNSS receiver must receive a new set of parameter values for the orbit model of the navigation satellite if the position of the GNSS receiver is to be determined with sufficient accuracy. However, the acquisition of broadcast ephemeris data from the navigation satellite may be a time consuming process taking up to several minutes or may require substantial network access.

As a result, an Ephemeris Extension Service (EES) is available to extend the useful lifespan of the broadcast ephemeris data. In a typical EES system, the orbit of a satellite is predicted by integrating output values of an equation of motion defined for the satellite. The last reliable position of the satellite that can be determined with the broadcast ephemeris data may be utilized as an initial state of the orbit for the integration. The predictions of the orbit of a satellite provided by an EES can be formatted in various manners including as a continuous polynomial function, such as a spline or Hermitea polynomial function, as a piecewise continuous function or as a delta or differential correction to the broadcast ephemeris data or almanac, etc. The equation of motion may be referenced as a force model, as the equation is based on forces acting upon the satellite. Although the orbit of the satellite may be predicted most accurately by including all forces that have a distinguishable effect upon the satellite, the equation of motion generally includes only the forces that contribute most significantly to the position of the satellite, such as by including the gravitational forces of the earth, the sun and the moon, as well as solar radiation pressure.

Several Ephemeris Extension Services are available including the ephemeris extension technology included in the $3^{rd}$ Generation Partnership Project (3GPP) standards beginning with Release8 and available for GPS, GLONASS and Galileo systems. This ephemeris extension technology provides differential corrections to a reference ephemeris. In addition, other types of Ephemeris Extension Services that are available include GPSOneXtra from Qualcomm Technologies, Inc., Long-Term Orbit (LTO) from Broadcom Inc. and Predicted GPS (PGPS) from RX Networks, Inc. These other types of Ephemeris Extension Services also allow the broadcast ephemeris lifetime to be extended, such as for seven days.

The prediction of the position of a navigation satellite beyond the lifetime of the broadcast ephemeris data, such as provided by ephemeris extension, generally relies upon a prediction algorithm that is computationally intensive. Thus, the prediction of the position of a navigation satellite is generally performed by a device having the necessary competing resources. Further details are provided by U.S. Pat. No. 10,564,292 which issued Feb. 18, 2020, the contents of which are incorporated herein in their entirety. The accuracy of the predictions of the position of a navigation satellite beyond the lifetime of the broadcast ephemeris data that are provided by ephemeris extension is increasingly diminished as more time passes since the expiration of the lifetime of the most recent broadcast ephemeris data.

To increase the accuracy with which the position of a navigation satellite is predicted, the predicted position of the navigation satellite at different points in time based upon ephemeris extension can be corrected. A computing device may therefore both (i) predict the position of a navigation satellite utilizing ephemeris extension so as to extend the lifetime of the broadcast ephemeris data and (ii) correct the predicted position of the navigation satellite in order to more accurately predict the position of the navigation satellite and, in turn, to facilitate the more accurate determination of the location of the GNSS receiver, particularly as time elapses since the expiration of the broadcast ephemeris data. However, the prediction of the position of a navigation satellite utilizing an ephemeris extension and the subsequent correction of the predicted position can be computationally intensive.

Although a serving computing device, e.g., a server, may have sufficient computing resources to be able to both (i) predict the position of a navigation satellite utilizing ephemeris extension and (ii) correct the predicted position of the navigation satellite, a client computing device, such as an TOT device, may have more limited computing resources, thereby potentially limiting the prediction technique that may be employed. In this regard, a client computing device may only be able to predict the position of the navigation satellite that requires fewer computational resources and, as a result, is less accurate, such as a technique that utilizes a force model that takes into account a fewer number of forces that act upon the navigation satellite. As a result, the accuracy with which a client computing device may be able to predict the position of the navigation satellite and, in turn, the location of the GNSS receiver may be limited.

BRIEF SUMMARY

A method, apparatus and computer program product are provided in accordance with an example embodiment in order to correct a predicted value of the position of a navigation satellite and/or the clock offset of a clock of the navigation satellite. The method, apparatus and computer program product of an example embodiment permit the prediction of the position of the navigation satellite at one or more points in time to be performed by a different computing device than the computing device that corrects at least one predicted value of the position of a navigation satellite and/or the clock offset of a clock of the navigation satellite. For example, a serving computing device may provide the prediction for the position of the navigation satellite at one or more points in time within a prediction interval, while a client computing device, such as a mobile device, e.g., an TOT device, may be configured to correct at least one predicted value of the position of a navigation satellite and/or the clock offset of the clock of the navigation satellite. As a result, the serving computing device may be utilized to perform the more computationally intensive prediction of the position of the navigation satellite, such as by ephemeris extension, while the client computing device may be configured to perform, such as on a more frequent basis, the less computationally intensive correction of the predicted value(s) of the position of a navigation satellite and/or the clock offset of the clock of the navigation satellite. By utilizing a serving computing device having more computational resources than a client computing device, the method, apparatus and computer program product of an example embodiment may utilize more accurate prediction models for the determination of the position of a navigation satellite at one or more points in time within a prediction interval even though such more accurate prediction models may require the consumption of additional computing resources that would be computationally difficult or impossible for the client computing device to perform.

In an example embodiment, a method is provided for correcting a predicted value for at least one of a position of a navigation satellite or a clock offset of a clock of the navigation satellite. The method includes receiving, from a serving computing device, a prediction including at least one predicted value for the position of the navigation satellite at one or more points in time within a prediction interval. The method also includes determining, with a client computing device, such as an Internet of Things (IoT) device, different than the serving computing device, at least one error component. Based at least upon the at least one error component, the method further includes correcting, with the client computing device, the prediction received from the serving computing device to generate a corrected prediction. In this regard, the correcting of the prediction includes correcting at least one predicted value for one or more of: (i) the position of the navigation satellite or (ii) the clock offset of the clock of the navigation satellite.

The method of an example embodiment also includes receiving signals transmitted by the navigation satellite and determining the position of the navigation satellite based upon the signals transmitted by the navigation satellite. In this regard, the determining of the at least one error component includes determining the at least one error component based at least in part upon a difference between the position of the navigation satellite that is determined based upon the signals transmitted by the navigation satellite and the predicted value for the position of the navigation satellite at the same point in time.

The method of an example embodiment further includes determining a location of the client computing device based at least upon: (a) a signal transmitted by the navigation satellite and (b) the corrected prediction. In this example embodiment, the location of the client computing device may be determined by the client computing device without further communication with the serving computing device after having received the prediction for the position of the navigation satellite at the one or more points in time within the prediction interval. In an example embodiment, the position of the navigation satellite at the one or more points in time within the prediction interval may be predicted by the serving computing device utilizing a prediction algorithm, and the at least one predicted value of the position of the navigation satellite or the one or more points in time may be corrected by the client computing device utilizing a correction algorithm. In this example embodiment, the correction algorithm utilized by the client computing device may be lighter weight than the prediction algorithm utilized by the serving computing device since utilization of the correction algorithm consumes fewer computational resources than utilization of the prediction algorithm.

In another example embodiment, an apparatus is provided that is embodied by a client computing device, such as an IoT device, and is configured to correct a predicted value for at least one of a position of a navigation satellite or clock offset of a clock of the navigation satellite. The apparatus includes at least one processor and at least one non-transitory memory including computer program code instructions stored therein with the computer program code instructions configured to, when executed by the at least one processor, cause the apparatus at least to receive, from a serving computing device, a prediction including at least one predicted value for the position of the navigation satellite at one or more points in time within a prediction interval. The computer program code instructions are also configured to, when executed by the at least one processor, cause the apparatus to determine, at the client computing device, different than the serving computer device, at least one error component. Based at least upon the at least one error component, the computer program code instructions are further configured to, when executed by the at least one processor, cause the apparatus to correct, at the client computing device, the prediction received from the serving computing device to generate a corrected prediction. In this regard, the apparatus is caused to correct the prediction by correcting at least one predicted value for one or more of: (i) the position of the navigation satellite or (ii) the clock offset of the clock of the navigation satellite.

The computer program code instructions are further configured to, when executed by the at least one processor, cause the apparatus of an example embodiment to receive signals transmitted by the navigation satellite and determine the position of the navigation satellite based upon the signals transmitted by the navigation satellite. In this regard, the apparatus is caused to determine the at least one error component by determining the at least one error component based at least in part upon a difference between the position of the navigation satellite that is determined based upon the signals transmitted by the navigation satellite and the predicted value for the position of the navigation satellite at the same point in time.

The computer program code instructions are further configured to, when executed by the at least one processor, cause the apparatus of an example embodiment to determine a location of the client computing device based at least upon: (a) a signal transmitted by the navigation satellite and (b) the corrected prediction. In this example embodiment, the location of the client computing device is determined at the client computing device without further communication with the serving computing device after having received the prediction for the position of the navigation satellite at the one or more points in time within the prediction interval. The position of the navigation satellite at the one or more points in time within the prediction interval may be predicted by the serving computing device utilizing a prediction algorithm, and at least one of the predicted value of the position of the navigation satellite or the one or more points in time may be corrected at the client computing device utilizing a correction algorithm. In this example embodiment, the correction algorithm utilized by the apparatus embodied by the client computing device is lighter weight than the prediction algorithm utilized by the serving computing device since utilization of the correction algorithm consumes fewer computational resources than utilization of the prediction algorithm.

In a further example embodiment, a method is provided for providing a prediction relating to a navigation satellite to a client computing device configured to at least partially correct one or more errors in the prediction. The method includes determining, with a serving computing device, a position of the navigation satellite at a respective point in time. The method also includes determining, with the serving computing device, the prediction of the position of the navigation satellite at the one or more points in time within a prediction interval based at least upon the position of the navigation satellite at the respective point in time. The method further includes providing the prediction including at least one predicted value of the position of the navigation satellite at the one or more points in time within the prediction interval to a client computing device, different than the serving computing device. In this regard, the client computing device is configured to correct the at least one predicted value provided by the serving computing device of: (i) the position of the navigation satellite or (ii) the clock offset of the clock of the navigation satellite.

A method of an example embodiment determines the prediction of the position of the navigation satellite at the one or more points in time within the prediction interval by determining the predication of the position of the navigation satellite based upon gravitational forces of the Earth, sun and moon and solar radiation pressure and also based upon one or more additional forces. In an embodiment in which the serving computing device includes a neural network or is configured to implement a deep learning model, the method determines the prediction of the position of the navigation satellite at the one or more points in time within the prediction interval by utilizing the neural network or the deep learning model to predict the position of the navigation satellite at the one or more points in time within the prediction interval based at least upon ephemeris parameters received from the navigation satellite.

The position of the navigation satellite at the one or more points in time within the prediction interval may be predicted by the serving computing device utilizing a prediction algorithm, and at least one predicted value of the position of the navigation satellite or the one or more points in time may be corrected by the client computing device utilizing a correction algorithm. In this example embodiment, the prediction algorithm utilized by the serving computing device is heavier weight than the correction algorithm utilized by the client computing device since utilization of the prediction algorithm consumes more computational resources than utilization of the correction algorithm. The method of an example embodiment provides the prediction of the position of the navigation satellite to the client computing device by providing the prediction of the position of the navigation satellite at the one or more points in time within the prediction interval to the client computing device prior to ceasing communication with the client computing device with the client computing device subsequently correcting at least one predicted value of: (i) the position of the navigation satellite or (ii) the clock offset of the clock of the navigation satellite.

In yet another example embodiment, an apparatus is provided that is embodied by a serving computing device and configured to provide a prediction relating to a navigation satellite to a client computing device configured to at least partially correct one or more errors in the prediction. The apparatus includes at least one processor and at least one non-transitory memory including computer program code instructions stored therein with the computer program code instructions configured to, when executed by the at least one processor, cause the apparatus at least to determine, at the serving computing device, a position of the navigation satellite at a respective point in time. The computer program code instructions are also configured to, when executed by the at least one processor, cause the apparatus to determine, at the serving computing device, the prediction of the position of the navigation satellite at the one or more points in time within a prediction interval based at least upon the position of the navigation satellite at the respective point in time. The computer program code instructions are further configured to, when executed by the at least one processor, cause the apparatus to cause the prediction including at least one predicted value of the position of the navigation satellite at the one or more points in time within the prediction interval to be provided to a client computing device, different than the serving computing device. In this regard, the client computing device is configured to correct the at least one predicted value provided by the serving computing device of: (i) the position of the navigation satellite or (ii) the clock offset of the clock of the navigation satellite.

The computer program code instructions are configured to, when executed by the at least one processor, cause the apparatus of an example embodiment to determine the prediction of the position of the navigation satellite at the one or more points in time within the prediction interval by determining the predication of the position of the navigation satellite based upon gravitational forces of the Earth, sun and moon and solar radiation pressure and also based upon one or more additional forces. In an example embodiment in which the at least one processor includes a neural network or is configured to implement a deep learning model, the computer program code instructions are configured to, when executed by the at least one processor, cause the apparatus to determine the prediction of the position of the navigation satellite at the one or more points in time within the prediction interval by utilizing the neural network or the deep learning model to predict the position of the navigation satellite at the one or more points in time within the prediction interval based at least upon ephemeris parameters received from the navigation satellite.

The position of the navigation satellite at the one or more points in time within the prediction interval may be predicted by the serving computing device utilizing a prediction algorithm, and at least one predicted value of the position of the navigation satellite or the one or more points in time may be corrected by the client computing device utilizing a correction algorithm. In this example embodiment, the prediction algorithm utilized by the serving computing device is heavier weight than the correction algorithm utilized by the client computing device since utilization of the prediction algorithm consumes more computational resources than utilization of the correction algorithm. The computer program code instructions are configured to, when executed by the at least one processor, cause the apparatus of an example embodiment to cause the prediction of the position of the navigation satellite to be provided to the client computing device by causing the prediction of the position of the navigation satellite at the one or more points in time within the prediction interval to be provided to the client computing device prior to ceasing communication with the client computing device with the client computing device subsequently correcting at least one predicted value of: (i) the position of the navigation satellite or (ii) the clock offset of the clock of the navigation satellite.

BRIEF DESCRIPTION OF THE DRAWINGS

Having thus described example embodiments of the present disclosure in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in order to correct a predicted value for at least one of a position of a navigation satellite or a clock offset of a clock of the navigation satellite, such as the offset of the on-board clock of the navigation satellite relative to GNSS, e.g., GPS, time. In this regard, the position of the navigation satellite may be predicted for points in time following the expiration of the lifetime of broadcast ephemeris data previously provided by the navigation satellite. By providing for a correction to the predicted value, the position of a navigation satellite at a particular point in time may be determined with more accuracy such that the position of a GNSS receiver and, as a result, a client computing device, such as a mobile device, incorporating the GNSS receiver may be correspondingly determined with greater accuracy even after the lifetime of the broadcast ephemeris data.

As described below, the prediction of the position of a navigation satellite at a point in time and the correction of the predicted value may be performed by different devices. In this regard, the prediction of the position of a navigation satellite at a particular point in time may be performed by a serving computing device and the correction of the predicted value may be performed by the client computing device, such as a mobile device, e.g., an TOT device. Thus, the more substantial computing resources of the serving computing device may be utilized to perform the more computationally intensive prediction of the position of the navigation satellite at a particular point in time, while conserving the more limited computing resources of the client computing device to perform the correction of the predicted value. In this regard, the determination of the correction of the predicted value is less computationally intensive in comparison to the prediction of the position of the navigation satellite at a particular point in time and, as a result, may be more readily performed by the client computing device.

Figure 1:
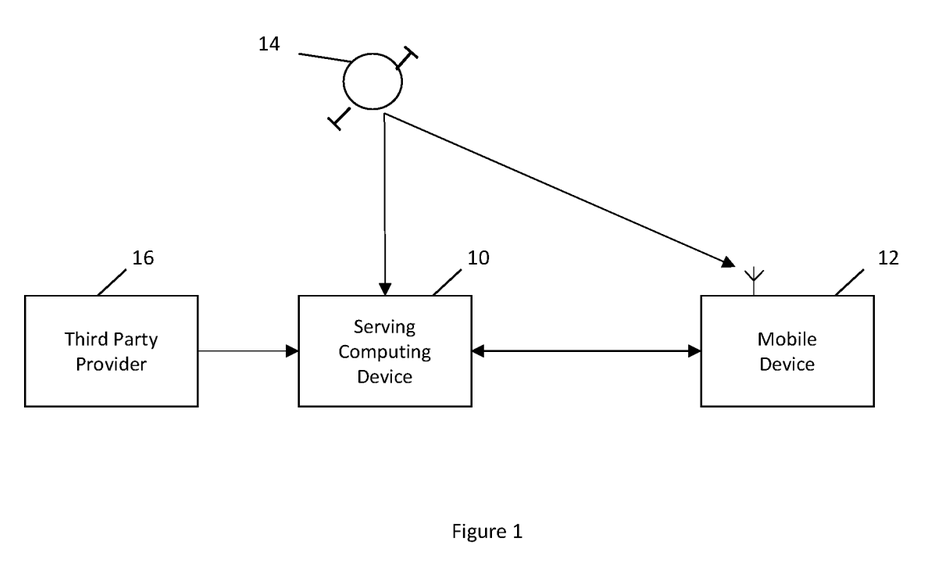
FIG. 1 illustrates a system for determining the location of a mobile device including a navigation satellite, a serving computing device and the mobile device in accordance with an example embodiment of the present disclosure.

Referring now to FIG. 1, a serving computing device 10 and a client computing device 12 are in communication with the navigation satellite 14. Although FIG. 1 depicts a single client computing device, the navigation satellite and the serving computing device may be in communication with a plurality of client computing devices with the serving computing device configured to provide a prediction of the position of the navigation satellite at one or more points in time within a prediction interval to each of the plurality of client computing devices. In addition, although a single navigation satellite is depicted for purposes of illustration, the navigation satellite is typically one of a constellation of navigation satellites that orbit the earth. For example, the navigation satellite may be a GNSS satellite, such as a GPS satellite, a GLONASS satellite, a Beidou satellite, a Galileo satellite or a regional SBAS satellite. Regardless of the type of navigation satellite, the navigation satellite provides signals, such as on a periodic basis, that includes broadcast ephemeris data that defines the orbit of the navigation satellite for the lifetime of the broadcast ephemeris data, such as for a predefined period of time, e.g., four hours. Based upon the broadcast ephemeris data, the position of the navigation satellite may be determined within the predefined period of time.

A serving computing device 10 may be embodied by any of a variety of computing devices including, for example, a server, a cloud computing device, a computer workstation, a distributed network of computing devices, a personal computer, a positioning or navigation system or any other type of computing device. The serving computing device may include a receiver, such as a GNSS receiver, for receiving signals transmitted by the navigation satellite 14, such as a message including the broadcast ephemeris data. As described below, the serving computing device is generally configured to predict the position of the navigation satellite at one or more points in time within a prediction interval. The prediction interval may extend temporally beyond a predefined period of time during which the broadcast ephemeris data is valid so as to predict the position of the navigation satellite at each of a plurality of points in time following the lifetime of the broadcast ephemeris data. Although the serving computing device may be configured to predict the position of the navigation satellite at the plurality of points in time within the prediction interval in any of a variety of different manners, the serving computing device of an example embodiment is configured to predict the position of the navigation satellite utilizing a prediction algorithm, such as a prediction algorithm that provides an ephemeris extension of the broadcast ephemeris data.

The client computing device 12 is also configured to communicate with the navigation satellite 14, as well as to receive information transmitted by the serving computing device 10. As a result, the client computing device may also include a receiver, such as a GNSS receiver, for receiving the signals transmitted by the navigation satellite. The client computing device may be embodied by any of a variety of devices including, for example, a mobile device, such as a mobile terminal, e.g., a personal digital assistant (PDA), mobile telephone, smart phone, personal navigation device, smart watch, tablet computer, or any combination of the aforementioned and other types of portable computer devices, or a positioning or navigation system such as a positioning or navigation system onboard a vehicle, e.g., an automobile, a truck, a drone, a train, etc. In an example environment, however, the client computing device is an Internet of Things (TOT) device that includes a GNSS receiver. Regardless of the manner in which the client computing device is embodied, the client computing device is configured to determine its location based upon a signal transmitted by the navigation satellite and the prediction of the position of the navigation satellite at one or more points in time within the prediction interval provided by the serving computing device. In order to more accurately determine the position of the navigation satellite and, in turn, the location of the client computing device, the client computing device is configured to correct the predicted value(s) provided by the serving computing device of the position of the navigation satellite and/or at least one of the one or more points in time at which the navigation satellite is predicted to be at the position. As such, the client computing device is configured to more accurately determine the position of the navigation satellite such that the location of the client computing device may, in turn, be determined with increased accuracy.

Although the client computing device 12 may have fewer computing resources, such as substantially fewer computing resources, than the serving computing device 10, the prediction of the position of the navigation satellite 14 at one more points in time within the prediction interval by the serving computing device conserves the processing resource of the client computing device to perform the correction of the predicted value(s) of the position of the navigation satellite and/or the time at which the navigation satellite is predicted to be at the position. In this regard, the prediction of the position of the navigation satellite at one or more points in time within the prediction interval, such as in accordance with a prediction algorithm, is generally more computationally intensive than the subsequent correction in accordance with a correction algorithm of a predicted value (s) of the position of the navigation satellite and/or at least one of the one or more points in time at which the satellite is predicted to be at the position.

Figure 2:
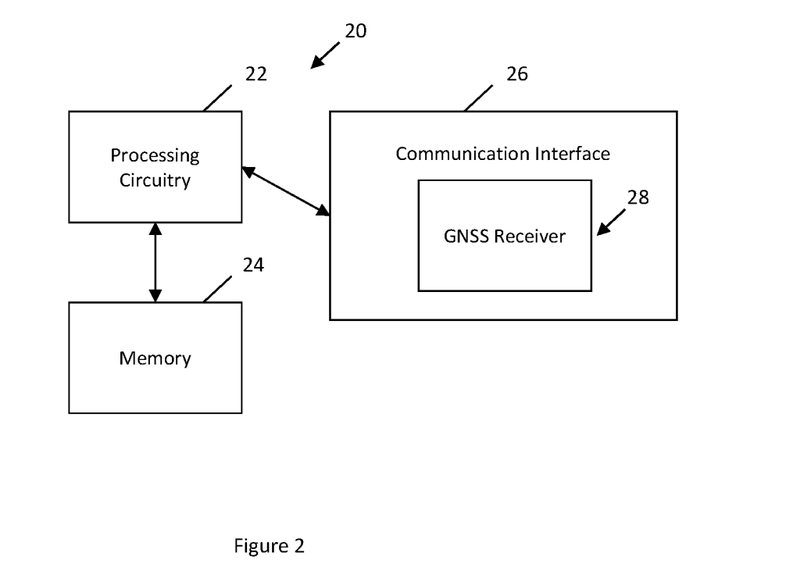
FIG. 2 is a block diagram of an apparatus that may be embodied by a serving computing device or a client computing device and that may be specifically configured in accordance with an example embodiment of the present disclosure.

An apparatus 20 that may be embodied by the serving computing device 10 and/or the client computing device 12 is depicted in FIG. 2. As shown in FIG. 2, the apparatus includes processing circuitry 22, a memory device 24 and a communication interface 26.

In some embodiments, the processing circuitry 22 (and/or co-processors or any other processors assisting or otherwise associated with the processing circuitry) can be in communication with the memory device 24 via a bus for passing information among components of the apparatus 20. The memory device can be non-transitory and can include, for example, one or more volatile and/or non-volatile memories. In other words, for example, the memory device may be an electronic storage device (for example, a computer readable storage medium) comprising gates configured to store data (for example, bits) that can be retrievable by a machine (for example, a computing device like the processing circuitry). The memory device can be configured to store information, data, content, applications, instructions, or the like for enabling the apparatus to carry out various functions in accordance with an example embodiment of the present disclosure. For example, the memory device can be configured to buffer input data for processing by the processing circuitry. Additionally or alternatively, the memory device can be configured to store instructions for execution by the processing circuitry.

The processing circuitry 22 can be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry can include one or more processing cores configured to perform independently. A multi-core processor can enable multiprocessing within a single physical package. Additionally or alternatively, the processing circuitry can include one or more processors configured in tandem via the bus to enable independent execution of instructions, pipelining and/or multithreading.

In an example embodiment, the processing circuitry 22 can be configured to execute instructions stored in the memory device 24 or otherwise accessible to the processing circuitry. Alternatively or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, a computing device) configured to employ an embodiment of the present disclosure by further configuration of the processor by instructions for performing the algorithms and/or operations described herein. The processing circuitry can include, among other things, a clock, an arithmetic logic unit (ALU) and/or one or more logic gates configured to support operation of the processing circuitry.

The apparatus 20 of an example embodiment can also include the communication interface 26. The communication interface can be any means such as a device or circuitry embodied in either hardware or a combination of hardware and software that is configured to receive and/or transmit data from/to other electronic devices in communication with the apparatus, such as by providing for communication between a mobile device 12 and a serving computing device 10. The communication interface can be configured to communicate in accordance with various wireless protocols including Global System for Mobile Communications (GSM), such as but not limited to Long Term Evolution (LTE). In this regard, the communication interface can include, for example, an antenna (or multiple antennas) and supporting hardware and/or software for enabling communications with a wireless communication network. Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication. In addition to supporting communication between a mobile device and a serving computing device, the communication interface may also be configured to support communication with one or more navigation satellites 14. As such, the communication interface of an example embodiment may also include a satellite receiver, such as a GNSS receiver 28.

Figure 3:
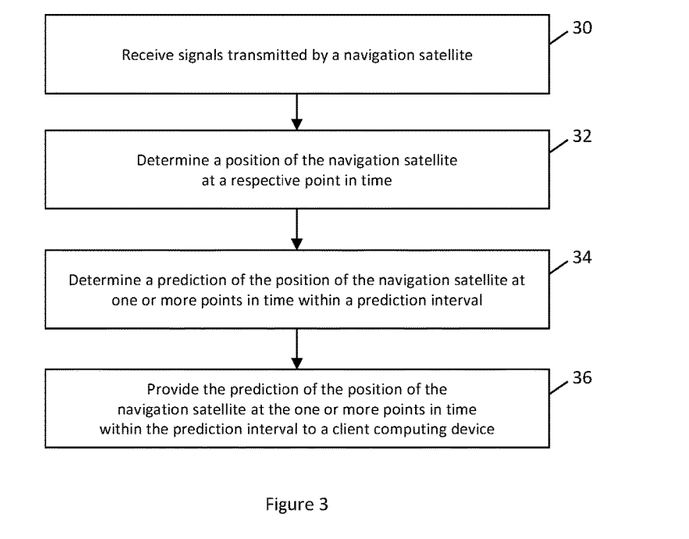
FIG. 3 is a flowchart illustrating the operations performed, such as by the apparatus of FIG. 2 as embodied by a serving computing device, in accordance with an example embodiment of the present disclosure.

Referring now to FIG. 3, the operations performed by the apparatus 20, such as an apparatus embodied by the serving computing device 10, are depicted. As shown in block 30, the apparatus includes means, such as the processing circuitry 22, the communication interface 26, the GNSS receiver 28 or the like, for receiving signals transmitted by a navigation satellite 14 or at least navigation data, such as broadcast ephemeris data, included in the signals transmitted by the navigation satellite. The signals transmitted by the navigation satellite may be received by the serving computing device directly from the navigation satellite as shown in FIG. 1 or from an intermediate entity. Additionally or alternatively, the navigation data may be received from a third party provider 16 as also shown in FIG. 1. In either instance, the navigation data included in the signals transmitted by the navigation satellite include broadcast ephemeris data that permits the orbit and, in turn, the position of the satellite to be determined during the lifetime of the broadcast ephemeris data. As shown in block 32, the apparatus also includes means, such as the processing circuitry or the like, for determining the position of the navigation satellite at a respective point in time. In this regard, the apparatus, such as the processing circuitry, is configured to determine the position of the navigation satellite based upon the navigation data included in the signals transmitted by the navigation satellite, such as the broadcast ephemeris data. As the broadcast ephemeris data is valid for a predefined period of time, the apparatus, such as the processing circuitry, is configured to determine the position of the navigation satellite at a point in time during the lifetime of the broadcast ephemeris data, such as within the predefined period of time during which the broadcast ephemeris data is effective. The position of the navigation satellite may be determined in any of various coordinate systems including an XYZ coordinate system, an ECEF coordinate system or the like.

As shown in block 34 of FIG. 3, the apparatus 20 embodied by the serving computing device 10 also includes means, such as the processing circuitry 22 or the like, for determining a prediction of the position of the navigation satellite 14 at one or more points in time within a prediction interval, such as a predetermined period of time following, such as immediately following, the lifetime of the broadcast ephemeris data. The prediction interval during which the position of the navigation satellite is predicted therefore extends beyond the lifetime of the broadcast ephemeris data and is based upon one or more positions of the navigation satellite that were determined based upon the broadcast ephemeris data and that were within the lifetime of the broadcast ephemeris data. Alternatively, the position of the navigation satellite may be predicted in the opposite direction, that is, prior to the period of time during which the broadcast ephemeris data is valid.

The apparatus 20, such as the processing circuitry 22, may be configured to determine a predicted value of the position of the navigation satellite 14 based upon a prediction algorithm that implements an ephemeris extension of the broadcast ephemeris data including, for example, any of the variety of ephemeris extension models described above. As such, the apparatus, such as the processing circuitry, may be configured to define the prediction of the orbit of the navigation satellite provided by an EES in any of various manners including as a continuous polynomial function, such as a spline or Hermitea polynomial function, as a piecewise continuous function or as a delta or differential correction to the broadcast ephemeris data or almanac, etc.

In addition to predicting the position of the navigation satellite 14, the apparatus 20 embodied by the serving computing device 10, such as the processing circuitry 22, is configured to determine the clock offset of a clock onboard the navigation satellite, such as the clock offset relative to GNSS, e.g., GPS, time. The apparatus, such as the processing circuitry, of this example embodiment therefore also includes a prediction model of the clock offset of the clock of the navigation satellite.

As noted above, the apparatus 20, such as the processing circuitry 22, may be configured to predict the position of the navigation satellite 14 at one or more points in time within the prediction interval in various manners. In this regard, the prediction of the position of the navigation satellite at the one or more points of time within the prediction interval includes the prediction of the position of the navigation satellite, the prediction of the clock offset of the clock of the navigation satellite or both. In an example embodiment, the apparatus, such as the processing circuitry, is configured to determine the position of the navigation satellite at the one or more points of time within the prediction interval in accordance with a prediction algorithm that is based upon gravitational forces of the earth, sun and moon and solar radiation pressure. In some example embodiments, the apparatus, such as the processing circuitry, is configured to determine the prediction of the position of the navigation satellite not only based upon the gravitational forces of the earth, sun and moon and solar radiation pressure, but also based upon one or more additional forces, such as the gravitational forces of other celestial body(ies), the tidal effect, solar radiation reflected from the surface of the earth, etc.

Although the apparatus 20 embodied by the serving computing device 10, such as the processing circuitry 22, may be configured to determine the prediction of the position of the navigation satellite 14 at one or more points of time within the prediction interval in an algorithmic manner, such as in accordance with a prediction algorithm, based upon the contribution of various forces, the apparatus, such as the processing circuitry, of another example embodiment may include a neural network or may be configured to implement a deep learning model with the neural network or the deep learning model being trained to determine the predicted position of the navigation satellite at the one or more points of time within the prediction interval. In this regard, the apparatus, such as the processing circuitry, may be configured to utilize the neural network or the deep learning model to predict the position of the navigation satellite at the one or more points in time within the prediction interval based at least upon the broadcast ephemeris data received from the navigation satellite. In this regard, the neural network or the deep learning model may be trained utilizing a plurality of sets of broadcast ephemeris data provided by a navigation satellite to predict the position of the navigation satellite at one or more points of time within a prediction interval following the lifetime of the broadcast ephemeris data. These predictions by the neural network or deep learning model may be compared to the actual position of the navigation satellite at the same points in time within the prediction interval in order to train the neural network or the deep learning model and to improve its prediction of the position of the navigation satellite at one or more points of time within the prediction interval.

In yet another example embodiment, the apparatus 20, such as the processing circuitry 22, is configured to utilize a hybrid approach to determine the prediction of the position of the navigation satellite 14 at one or more points of time within the prediction interval. In this embodiment, the apparatus, such as the processing circuitry, is configured to utilize both an algorithmic approach, such as in accordance with a prediction algorithm, based upon the contribution of various forces as well as a deep learning model to determine the prediction of the position of the navigation satellite at one or more points of time within the prediction interval. For example, the apparatus, such as the processing circuitry, may be configured to initially utilize an algorithmic approach, such as will the deep learning model is being trained, and to thereafter utilize the deep learning model, as trained, to determine the prediction of the position of the navigation satellite at one or more points of time within the prediction interval.

Regardless of the technique by which the apparatus 20 embodied by the serving computing device 10, such as the processing circuitry 22, determines the prediction of the position of the navigation satellite 14, the prediction of the position of the navigation satellite consumes more computational resources than a subsequent correction as described below of the predicted value(s) of the position of the navigation satellite and/or the one or more points of time at which the navigation satellite is predicted to be at the position. For example, in an instance in which the apparatus, such as the processing circuitry, is configured to determine the prediction of the position of the navigation satellite at one or more points of time within the prediction interval utilizing a prediction algorithm, such as based upon gravitational forces of the earth, sun and moon, solar radiation pressure and optionally one or more additional forces, the prediction algorithm is heavier weight as a result of its consumption of more computational resources than a correction algorithm implemented as described below to correct the predicted value(s) of the position of the navigation satellite and/or the one or more points of time at which the navigation satellite is predicted to be located.

However, the apparatus 20, such as the processing circuitry 22, that is configured to determine the prediction of the position of the navigation satellite 14 at one or more points of time within the prediction interval may be embodied by the serving computing device 10 and the serving computing device may, in turn, have the more substantial computational resources required to determine the prediction of the position of the navigation satellite at the one or more points of time within the prediction interval. In this regard, the serving computing device may have the computational resources required for determining the prediction of the position of the navigation satellite at one or more points of time within the prediction interval with even greater accuracy. For example, the serving computing device may be configured to utilize a prediction algorithm that not only determines the prediction of the position of the navigation satellite based upon the gravitational forces of the earth, sun and moon and solar radiation pressure, but also based upon one or more additional forces, such as the gravitational forces of another celestial body, the tidal effect and/or solar radiation reflected from the surface of the earth. While the consideration of these additional forces allows for the prediction of the position of the navigation satellite at one or more points of time within the prediction interval to be provided with increased accuracy, the consideration of these additional forces consumes additional computational resources. However, the reliance upon the serving computing device to determine the predicted position of the navigation satellite at the one or more points in time within the prediction interval provides for the additional computational resources required for the more accurate prediction.

In some embodiments, the serving computing device 10 may be configured to accurately determine the prediction of the location of the navigation satellite 14 by referencing additional or alternative sources of data, such as one or more third party data providers and/or sources of historical data. In this regard, the serving computing device is configured to access these additional or alternative sources of data since the serving computing device has greater bandwidth and/or greater memory resources than the client computing device 12.

By way of another example, the apparatus 20, such as the processing circuitry 22, may be embodied by the serving computing device 10 having the computing resources that are capable of being configured to determine the prediction of the position of the navigation satellite 14 at the one or more points of time within the prediction interval utilizing a more sophisticated and fully trained neural network or deep learning model such that the resulting determination of the prediction of the position of the navigation satellite at the one or more points of time within the prediction interval is more accurate. Thus, the instantiation of the apparatus of this example embodiment by the serving computing device utilizes the substantial computational resources of the serving computing device to determine the prediction of the position of the navigation satellite at the one or more points in time within a prediction interval in accordance with a more computationally intensive process that results in more accurate results.

Also, the prediction by the apparatus 20, such as the processing circuitry 22, of the position of the navigation satellite 14 at one or more points in time, includes the prediction of the position of the navigation satellite over an interval of time comprised of a plurality of points in time. Thus, the apparatus, such as the processing circuitry, of this example embodiment is configured to predict the position of the navigation satellite effectively continuously over the interval of time.

As shown in block 36 of FIG. 3, the apparatus 20 embodied by the serving computing device 10 also includes means, such as the processing circuitry 22, the communication interface 26 or the like, for providing the prediction of the position of the navigation satellite 14 at the one or more points in time within the prediction interval to a client computing device 12. As described below, the prediction of the position of the navigation satellite at the one or more points in time within the prediction interval may be provided to a single mobile device or to a plurality of mobile devices for use in conjunction with the determination of the position of the respective mobile device. As also noted above, the prediction of the position of the navigation satellite at the one or more points in time may be provided to a variety of different types of client computing devices including, for example, mobile devices, e.g., IoT devices. At least some of the client computing devices, such as IoT devices, may have reduced computing capacity, such as substantially reduced computing capacity, relative to the serving computing device. As such, the determination of the prediction of the position of the navigation satellite at the one or more points in time within the prediction interval by the serving computing device advantageously conserves the computing resources of the client computing device and, in some embodiments, allows for the implementation of a prediction algorithm by the serving computing device that predicts the position of the navigation satellite with more accuracy by taking into account more forces and that consequently requires more computational capacity, such as potentially more computational capacity than supported by the client computing device, thereby providing for more accurate predictions of the position of the navigation satellite at the one or more points in time within the prediction interval.

Figure 4:
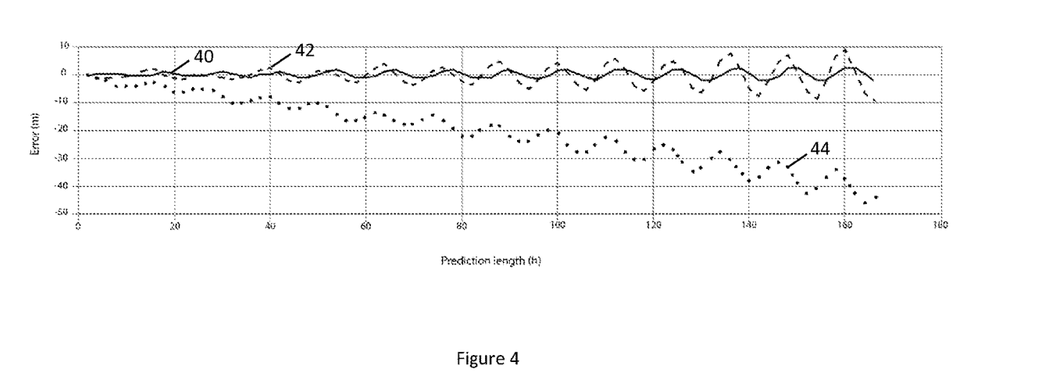
FIG. 4 is a graphical representation of three error components that reduce the accuracy with which the position of a navigation satellite may be predicted over time.

Although the serving computing device 10 determines a prediction of the position of the navigation satellite 14 at one or more points in time within a prediction interval, the accuracy of the prediction of the position of the navigation satellite becomes increasingly less accurate throughout the prediction interval. In this regard, the prediction is less accurate toward the end of the prediction interval than toward the beginning of the prediction interval. This reduction in the accuracy of the prediction of the position of the navigation satellite throughout the prediction interval is due to a plurality of orbital error components. FIG. 4 depicts the three orbital error components. These orbital error components include an error 40 in the radial direction as shown by the solid line, an error 42 in the normal, that is, cross-track, direction as shown by the dashed line and an error 44 in the transverse, that is, along-track, direction as shown by the dotted line. FIG. 4 depicts the evolution of the orbit error components over a one week period and illustrates the increasing magnitude of the error components over the week.

The error components may have a predictable behavior that may be parameterized. In this regard, the radial and normal error components may be characterized as sinusoidal waves having a linearly increasing amplitude with respect to time, while the transverse error component may be also characterized as a sinusoidal wave with a linearly increasing amplitude with respect to time but with the addition of a polynomial component, such as a quadratic component. These characterizations of the three error components may be parameterized into mathematical formulations and then fit according to observed data regarding the position of the navigation satellite 14 in order to define the free parameters of the mathematical formulations. For example, the phase of the sinusoidal wave, the rate of the amplitude growth and parameters for the quadratic component may be free parameters that are fit or defined according to the observed data regarding the position of the navigation satellite. For example, the radial (R) and normal (N) error components $e_{R,N}(t)$ at time t may be represented as:

$$e_{R,N}(t)=a_{R,N;0}*t*\sin(\omega*t+a_{R,N;1})$$

and the transverse (T) error component $e_T(t)$ at time t may be represented as:

$$e_T(t)=a_{T;0}*t*\sin(\omega*t+a_{T;1})+a_{T;2}*t+a_{T;3}*t^2$$

In the foregoing equations, t corresponds to time in terms of the length of the projection, $\omega$ corresponds to the frequency of the oscillation and may be predetermined, e.g., corresponding to the orbital period of the navigation satellite, $a_{X;i}$ is a free parameter corresponding to error component X (e.g., X may be chosen from R, N and T for the radial (R), normal (N) and transverse (T) error components) that may be optimized to minimize the difference between the model and the difference between the predicted and observed data, that is, the predicted and actual position of the navigation satellite at a point in time.

As shown above, the equation representing the radial and transverse error components has two free parameters, that is, the parameters associated with the amplitude and phase of the oscillation, and the equation representing the transverse error component as four free parameters, namely, the parameters associated with the quadratic and linear polynomial terms in addition to the parameters associated with the amplitude and phase of oscillation. Although the foregoing equations could have an additional free parameter representing the bias or offset at the beginning of the prediction interval, the foregoing equations have set the bias or offset component to zero based on the assumption that the error begins from zero at the beginning of the prediction interval.

By comparing, e.g., equating, the error in the position of the navigation satellite 14 at one or more points in time within the prediction interval predicted by the error component(s) to the difference between the actual position of the navigation satellite and the predicted position of the navigation satellite at those same points in time, the free parameters may be defined, thereby resulting in three fully defined equations setting forth the respective error components associated with the predicted position of the navigation satellite at one or more points in time within the prediction interval. In this regard, the comparison may be performed for at least the same number of points in time as the number of free parameters. Although the foregoing example of the correction algorithm provides corrections to various error components with respect to the predicted value of the position of the navigation satellite provided by the serving computing device 10, the correction algorithm may also or alternatively define a correction to the predicted value of at least one of the one or more points in time at which the navigation satellite is predicted to be at the position, that is, a correction as to the orbit time of the navigation satellite.

As described above, the predicted position for the navigation satellite 14 at one or more points in time may be based upon the gravitational forces of the earth, sun and moon and solar radiation pressure. In other embodiments, however, the prediction of the position of the navigation satellite may also be based upon one or more additional forces, such as the gravitational forces of another celestial body, a tidal effect or solar radiation from the surface of the earth. In an embodiment in which the prediction of the position of the navigation satellite provided by the serving computing device 10 is based upon one or more additional forces, the error component(s) associated with the predicted value for at least one of a position of the navigation satellite or a time at which the navigation satellite is predicted to be at the position may be defined by a different correction algorithm than those described above, such as correction equation(s) including an additional component that is added to or subtracted from the foregoing correction equations to take into account a correction attributable to the additional force that is considered in relation to the predicted position of the navigation satellite.

In order to provide the correction to a predicted value for at least one of the position of a navigation satellite 14 or a clock offset of a clock of the navigation satellite, such as relative to GNSS, e.g., GPS, time, a method, apparatus and computer program product are provided that may be implemented by the client computing device 12. As shown in block 50 of FIG. 5, an apparatus 20 embodied by the client computing device includes means, such as the processing circuitry 22, the communication interface 26 or the like, for receiving from the serving computing device 10 a prediction for the position of the navigation satellite at one or more points in time within the prediction interval. For example, the apparatus embodied by the client computing device may provide an application programming interface (API) via which the prediction is obtained.

In some instances, such as in an instance in which the free parameters of the mathematical formulations of the error parameters have not yet been defined, the apparatus 20 embodied by the client computing device 12 also includes means, such as the processing circuitry 22, the communication interface 26 or the like, for receiving signals transmitted by the navigation satellite 14. See block 52 of FIG. 5. Based upon the received signals that were transmitted by the navigation satellite, the apparatus embodied by the client computing device includes means, such as the processing circuitry, for determining the position of the navigation satellite. In this regard, the apparatus, such as the processing circuitry, may be configured to determine the position of the navigation satellite based upon the navigation data, such as the ephemeris data, included in the signals transmitted by the navigation satellite.

The apparatus 20 embodied by the mobile device 12 also includes means, such as the processing circuitry 22 or the like, for determining at least one error component. See block 54. Although a variety of different error components may be determined, the error components may be an error in the predicted value of the prediction of the position of the navigation satellite 14 or an error in the prediction of the clock offset of a clock of the navigation satellite. As exemplified by FIG. 4, in an instance in which the error component is an error in the predicted value of the position of the navigation satellite, the error component may be any of a plurality of different error components including a radial error component, a normal error component, a transverse error component or any combination thereof. In relation to the determination of the error component, the error component may be determined by the apparatus, such as the processing circuitry, based upon a correction algorithm for which the free parameters have been previously defined, such as by equating the error predicted by the error components to the actual error, that is, the difference between the predicted position of the navigation satellite at a respective point in time within the prediction interval and the actual position of the navigation satellite at the same point in time within the prediction interval. In an example embodiment, the apparatus, such as the processing circuitry, is configured to determine the at least one error component based at least in part upon a difference between the position of the navigation satellite that is determined based upon the signals transmitted by the navigation satellite as described above with respect to block 52 and the predicted value for the position of the navigation satellite at the same point in time that was received as described above with respect to block 50.

Figure 5:
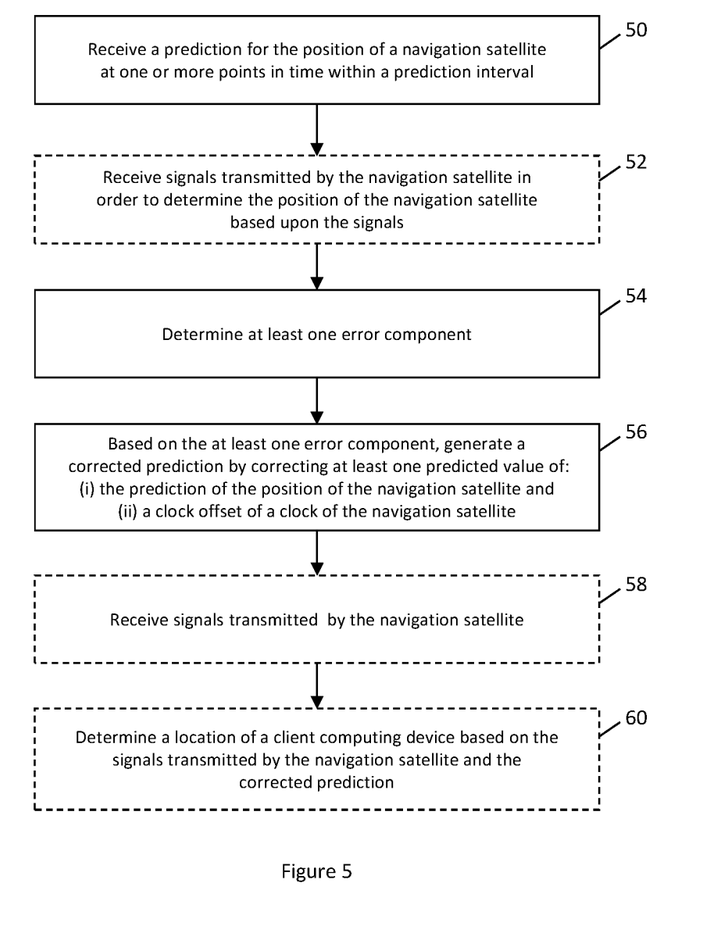
FIG. 5 is a flowchart illustrating the operations performed, such as by the apparatus of FIG. 2 as embodied by a client computing device, in accordance with an example embodiment of the present disclosure in which the blocks having a dashed outline are optional in at least some embodiments.

As shown in block 56, the apparatus 20 embodied by the client computing device 12 also includes means, such as the processing circuitry 22 or the like, for correcting, based at least upon the at least one error component, the prediction received from the serving computing device 10 to generate a corrected position. In this regard, the apparatus, such as the processing circuitry, is configured to correct the prediction by correcting at least one predicted value provided by the serving computing device 10 of (i) the position of the navigation satellite and/or (ii) the clock offset of the clock of the navigation satellite. In this regard, the apparatus, such as the processing circuitry, of the client computing device offsets the predicted position of the navigation satellite at one or more points in time within the prediction interval and/or alters the clock offset of the clock of the navigation satellite within the prediction interval based upon the correction indicated by the at least one error component.

For example, in an instance in which the determination of the at least one error component includes the determination of a radial error component, a normal error component and a transverse error component as shown in FIG. 4 in relation to the position of the navigation satellite 14 at one or more points in time within the prediction interval, the predicted value provided by the serving computing device of the position of the navigation satellite at a respective point in time may be corrected by altering the position of the navigation satellite in the radial, normal and transverse directions by the magnitude of the radial error component, a normal error component and a transverse error component, respectively, at the respective point in time. Additionally or alternatively, in an instance in which the error component is representative of an error in the orbit time at which the navigation satellite is predicted to be at a respective position, the apparatus 20, such as the processing circuitry 22, may be configured to correct the clock offset of the clock of the navigation satellite.

The correction of the predicted value(s) of the position of the navigation satellite 14 or the clock offset of the clock of the navigation satellite may be performed at any of various times, such as immediately following receipt of the predicted values from the serving computing device 10 or at some subsequent time, such as upon receipt of additional signals from the navigation satellite as described below, for example, with respect to block 58. If the correction is determined in advance of the receipt of additional signals from the navigation satellite, corrections to the predicted values across the entire prediction interval may be determined. In contrast, if the correction is determined upon the receipt of additional signals from the navigation satellite, the correction may be determined in a more limited manner by determining the correction to the prediction of the position of the navigation satellite at the time that the navigation satellite transmitted the additional signals. In either instance, the client computing device 12 may be configured to perform the correction after having discontinued communication with the serving computing device, that is, while offline relative to the serving computing device.

As shown in block 60, the apparatus 20 embodied by the client computing device 12 may also include means, such as the processing circuitry 22 or the like, for determining the location of the client computing device. In this regard, the location of the client computing device is based at least upon: (a) a signal transmitted by the navigation satellite 14 and (b) the corrected prediction. As with the navigation satellite, the location of the client computing device may be determined in any of various coordinate systems including an XYZ coordinate system, an ECEF coordinate system or the like.

As shown in block 58, the apparatus 20 of this example embodiment therefore also includes means, such as the processing circuitry 22, the communication interface 26, the GNSS receiver 28 or the like, for receiving a signal transmitted by the navigation satellite 14 during the prediction interval. The signals transmitted by the navigation satellite may be received by the client computing device 12 directly from the navigation satellite as shown in FIG. 1 or from an intermediate entity or navigation data may be received from a third party provider 16. Based upon the signal that is transmitted by the navigation satellite, the apparatus embodied by the client computing device, such as the processing circuitry, is configured to determine a transmission time of the signal. In this regard, the apparatus, such as the processing circuitry, may be configured to determine the transmission time based upon a difference between the time at which the navigation satellite transmitted the signal, as defined by information included with the signal, and the time at which the apparatus, such as the communication interface, the GNSS receiver or the like, received the signal. Based upon the transmission time of the signal transmitted by the navigation satellite and the predicted position of the navigation satellite, following correction (which may occur in some embodiments following the receipt of the signal transmitted by the navigation satellite), at the point in time at which the signal was transmitted by the navigation satellite, the apparatus embodied by the mobile terminal, such as the processing circuitry, may be configured to determine the location of the mobile terminal as described above in relation to block 608 of FIG. 5.

By having corrected at least one predicted value provided by the serving computing device 10 of: (i) the position of the navigation satellite 14 and/or (ii) at least one point in time at which the navigation satellite is predicted to be at the position, the position of the navigation satellite and, in turn, the location of the client computing device 12 (the determination of which is partially dependent upon the position of the navigation satellite) may be determined with increased accuracy throughout the prediction interval including during latter portions of the prediction interval in which the error components may become more sizable. Moreover, the determination and application of the error correction by the client computing device allows the client computing device to more quickly determine the location of the client computing device, that is, the time to first fix (TTFF), in response to receiving a signal transmitted by the navigation satellite in comparison to the time otherwise required to determine the location of the client computing device if the client computing device had to first determine the predicted position of the navigation satellite at the respective point in time following receipt of a signal from the navigation satellite.

Although the serving computing device 10 provides the prediction of the position of the navigation satellite 14 at one or more points in time within the prediction interval, the client computing device 12 of an example embodiment can thereafter determine the location of the client computing device and apply the appropriate correction thereto without further communication with the serving computing device throughout the prediction interval. As a result, network bandwidth is conserved and the computing resources otherwise required to effect further communication between the serving computing device and the mobile device, such as in response to the receipt of each signal transmitted by the navigation satellite by the client computing device, are also conserved.

As described above, the position of the navigation satellite 14 at the one or more points in time within the prediction interval may be predicted by the serving computing device 10 of one example embodiment utilizing a prediction algorithm. In this example embodiment, the predicted value(s) of the position of the navigation satellite and/or the clock offset of the clock of the navigation satellite may be corrected by the client computing device 12 utilizing a correction algorithm, such as correction equations for the radial, normal and transverse error components described above. The correction algorithm utilized by the client computing device of this example embodiment is lighter weight than the prediction algorithm utilized by the serving computing device since the utilization of the correction algorithm consumes fewer computational resources than utilization of the prediction algorithm. Thus, even though the, such as a mobile device, e.g., an IoT device, may have fewer computational resources than the serving computing device, the implementation of the prediction algorithm by the serving computing device conserves the more limited computational resources of the client computing device for the performance of other functions, such as the determination of the correction to the predicted value(s) provided by the serving computing device of the position of the navigation satellite and/or the clock offset of the clock of the navigation satellite. In an example embodiment, the more processing intensive activities relating to the determination of the predicted value(s) may be performed in the cloud, such as by a serving computing device implanted by a cloud computing device, and accessed via an API provided by the client computing device.

Additionally or alternatively, the implementation of the prediction algorithm by the serving computing device 10 may allow for a more accurate prediction algorithm to be utilized, such as a prediction algorithm that takes into account additional forces, since the serving computing device may have sufficient computational resources to implement the more accurate predication algorithm. While the client computing device 12 may have sufficient computational resources for implementing the correction algorithm, the client computing device of some embodiments may not have sufficient computational resources to implement the more accurate prediction algorithm such that the accuracy with which the position of the navigation satellite 14 could be predicted may be more limited if performed by the client computing device in comparison to the serving computing device, which has more computational resources for implementing the predication algorithm than the client computing device.

As described above, FIGS. 3 and 5 are flowcharts of an apparatus 20, method, and computer program product configured to determine the position of a navigation satellite 14 according to an example embodiment. It will be understood that each block of the flowcharts, and combinations of blocks in the flowcharts, may be implemented by various means, such as hardware, firmware, processing circuitry 22, and/or other devices associated with execution of software including one or more computer program instructions. For example, one or more of the procedures described above may be embodied by computer program instructions. In this regard, the computer program instructions which embody the procedures described above may be stored by the memory device 24 of the apparatus and executed by the processing circuitry or the like. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for correcting a predicted value for at least one of a position of a navigation satellite or a clock offset of a clock of the navigation satellite, the method comprising:
   receiving, from a serving computing device, a prediction including at least one predicted value for the position of the navigation satellite at one or more points in time within a prediction interval, wherein the prediction of the position of the navigation satellite at the one or more points of time within the prediction interval includes the prediction of the position of the navigation satellite, the prediction of the clock offset of the clock of the navigation satellite or both;
   determining, with a client computing device, different than the serving computing device, at least one error component; and
   based at least upon the at least one error component, correcting, with the client computing device, the prediction received from the serving computing device to generate a corrected prediction, the correcting comprising correcting at least one predicted value for one or more of: (i) the position of the navigation satellite or (ii) the clock offset of the clock of the navigation satellite.

2. A method according to claim 1, further comprising:
   receiving signals transmitted by the navigation satellite; and
   determining the position of the navigation satellite based upon the signals transmitted by the navigation satellite,
   wherein determining the at least one error component comprises determining the at least one error component based at least in part upon a difference between the position of the navigation satellite that is determined based upon the signals transmitted by the navigation satellite and the predicted value for the position of the navigation satellite at the same point in time.

3. A method according to claim 1, further comprising determining a location of the client computing device based at least upon: (a) a signal transmitted by the navigation satellite and (b) the corrected prediction.

4. A method according to claim 3, wherein the location of the client computing device is determined by the client computing device without further communication with the serving computing device after having received the prediction for the position of the navigation satellite at the one or more points in time within the prediction interval.

5. A method according to claim 3, wherein the position of the navigation satellite at the one or more points in time within the prediction interval is predicted by the serving computing device utilizing a prediction algorithm, wherein at least one predicted value of the position of the navigation satellite or the one or more points in time is corrected by the client computing device utilizing a correction algorithm, and wherein the correction algorithm utilized by the client computing device is lighter weight than the prediction algorithm utilized by the serving computing device since utilization of the correction algorithm consumes fewer computational resources than utilization of the prediction algorithm.

6. A method according to claim 1, wherein the client computing device comprises an Internet of Things (IOT) device.

7. An apparatus embodied by a client computing device and configured to correct a predicted value for at least one of a position of a navigation satellite or a clock offset of a clock of the navigation satellite, the apparatus comprising at least one processor and at least one non-transitory memory including computer program code instructions stored therein, the computer program code instructions configured to, when executed by the at least one processor, cause the apparatus at least to:
receive, from a serving computing device, a prediction including at least one predicted value for the position of the navigation satellite at one or more points in time within a prediction interval, wherein the prediction of the position of the navigation satellite at the one or more points of time within the prediction interval includes the prediction of the position of the navigation satellite, the prediction of the clock offset of the clock of the navigation satellite or both;
determine, at the client computing device, different than the serving computer device, at least one error component; and
based at least upon the at least one error component, correcting, at the client computing device, the prediction received from the serving computing device to generate a corrected prediction, the correcting comprising correcting at least one predicted value for one or more of: (i) the position of the navigation satellite or (ii) the clock offset of the clock of the navigation satellite.

8. An apparatus according to claim 7, wherein the computer program code instructions are further configured to, when executed by the at least one processor, cause the apparatus to:
receive signals transmitted by the navigation satellite; and
determine the position of the navigation satellite based upon the signals transmitted by the navigation satellite, wherein the computer program code instructions are configured to, when executed by the at least one processor, cause the apparatus to determine the at least one error component by determining the at least one error component based at least in part upon a difference between the position of the navigation satellite that is determined based upon the signals transmitted by the navigation satellite and the predicted value for the position of the navigation satellite at the same point in time.

9. An apparatus according to claim 7, wherein the computer program code instructions are further configured to, when executed by the at least one processor, cause the apparatus to determine a location of the client computing device based at least upon: (a) a signal transmitted by the navigation satellite and (b) the corrected prediction.

10. An apparatus according to claim 7, wherein the client computing device comprises an Internet of Things (IOT) device.

11. A method for providing a prediction relating to a navigation satellite to a client computing device configured to at least partially correct one or more errors in the prediction, the method comprising:
determining, with a serving computing device, a position of the navigation satellite at a respective point in time;
determining, with the serving computing device, the prediction of the position of the navigation satellite at the one or more points in time within a prediction interval based at least upon the position of the navigation satellite at the respective point in time, wherein the prediction of the position of the navigation satellite at the one or more points of time within the prediction interval includes the prediction of the position of the navigation satellite, the prediction of the clock offset of the clock of the navigation satellite or both; and
providing the prediction including at least one predicted value of the position of the navigation satellite at the one or more points in time within the prediction interval to the client computing device, different than the serving computing device, wherein the client computing device is configured to correct the at least one predicted value provided by the serving computing device of: (i) the position of the navigation satellite or (ii) the clock offset of the clock of the navigation satellite.

12. A method according to claim 11, wherein determining the prediction of the position of the navigation satellite at the one or more points in time within the prediction interval comprises determining the predication of the position of the navigation satellite based upon gravitational forces of the Earth, sun and moon and solar radiation pressure and also based upon one or more additional forces.

13. A method according to claim 11, wherein the serving computing device comprises a neural network or is configured to implement a deep learning model, and wherein determining the prediction of the position of the navigation satellite at the one or more points in time within the prediction interval comprises utilizing the neural network or the deep learning model to predict the position of the navigation satellite at the one or more points in time within the prediction interval based at least upon ephemeris parameters received from the navigation satellite.

14. A method according to claim 11, wherein the position of the navigation satellite at the one or more points in time within the prediction interval is predicted by the serving computing device utilizing a prediction algorithm, wherein at least one predicted value of the position of the navigation satellite or the one or more points in time is corrected by the client computing device utilizing a correction algorithm, and wherein the prediction algorithm utilized by the serving computing device is heavier weight than the correction algorithm utilized by the client computing device since utilization of the prediction algorithm consumes more computational resources than utilization of the correction algorithm.

15. A method according to claim 11, wherein providing the prediction of the position of the navigation satellite to the client computing device comprises providing the prediction of the position of the navigation satellite at the one or more points in time within the prediction interval to the client computing device prior to ceasing communication with the client computing device with the client computing device subsequently correcting at least one predicted value of: (i) the position of the navigation satellite or (ii) the clock offset of the clock of the navigation satellite.

16. An apparatus embodied by a serving computing device and configured to provide a prediction relating to a navigation satellite to a client computing device configured to at least partially correct one or more errors in the prediction, the apparatus comprising at least one processor and at least one non-transitory memory including computer program code instructions stored therein, the computer program code instructions configured to, when executed by the at least one processor, cause the apparatus at least to:

determine, at the serving computing device, a position of the navigation satellite at a respective point in time;

determine, at the serving computing device, the prediction of the position of the navigation satellite at the one or more points in time within a prediction interval based at least upon the position of the navigation satellite at the respective point in time, wherein the prediction of the position of the navigation satellite at the one or more points of time within the prediction interval includes the prediction of the position of the navigation satellite, the prediction of the clock offset of the clock of the navigation satellite or both; and cause the prediction including at least one predicted value of the position of the navigation satellite at the one or more points in time within the prediction interval to be provided to the client computing device, different than the serving computing device, wherein the client computing device is configured to correct the at least one predicted value provided by the serving computing device of: (i) the position of the navigation satellite or (ii) the clock offset of the clock of the navigation satellite.

17. An apparatus according to claim 16, wherein the computer program code instructions are configured to, when executed by the at least one processor, cause the apparatus to determine the prediction of the position of the navigation satellite at the one or more points in time within the prediction interval by determining the predication of the position of the navigation satellite based upon gravitational forces of the Earth, sun and moon and solar radiation pressure and also based upon one or more additional forces.

18. An apparatus according to claim 16, wherein the at least one processor comprises a neural network or is configured to implement a deep learning model, and wherein the computer program code instructions are configured to, when executed by the at least one processor, cause the apparatus to determine the prediction of the position of the navigation satellite at the one or more points in time within the prediction interval by utilizing the neural network or the deep learning model to predict the position of the navigation satellite at the one or more points in time within the prediction interval based at least upon ephemeris parameters received from the navigation satellite.

19. An apparatus according to claim 16, wherein the position of the navigation satellite at the one or more points in time within the prediction interval is predicted by the serving computing device utilizing a prediction algorithm, wherein at least one predicted value of the position of the navigation satellite or the one or more points in time is corrected by the client computing device utilizing a correction algorithm, and wherein the prediction algorithm utilized by the serving computing device is heavier weight than the correction algorithm utilized by the client computing device since utilization of the prediction algorithm consumes more computational resources than utilization of the correction algorithm.

20. An apparatus according to claim 16, wherein the computer program code instructions are configured to, when executed by the at least one processor, cause the apparatus to cause the prediction of the position of the navigation satellite to be provided to the client computing device by causing the prediction of the position of the navigation satellite at the one or more points in time within the prediction interval to be provided to the client computing device prior to ceasing communication with the client computing device with the client computing device subsequently correcting at least one predicted value of: (i) the position of the navigation satellite or (ii) the clock offset of the clock of the navigation satellite.

* * * * *